Nov. 3, 1931.  L. M. TARTAGLIA  1,830,298
CIRCUIT CLOSING DEVICE
Filed April 24, 1926
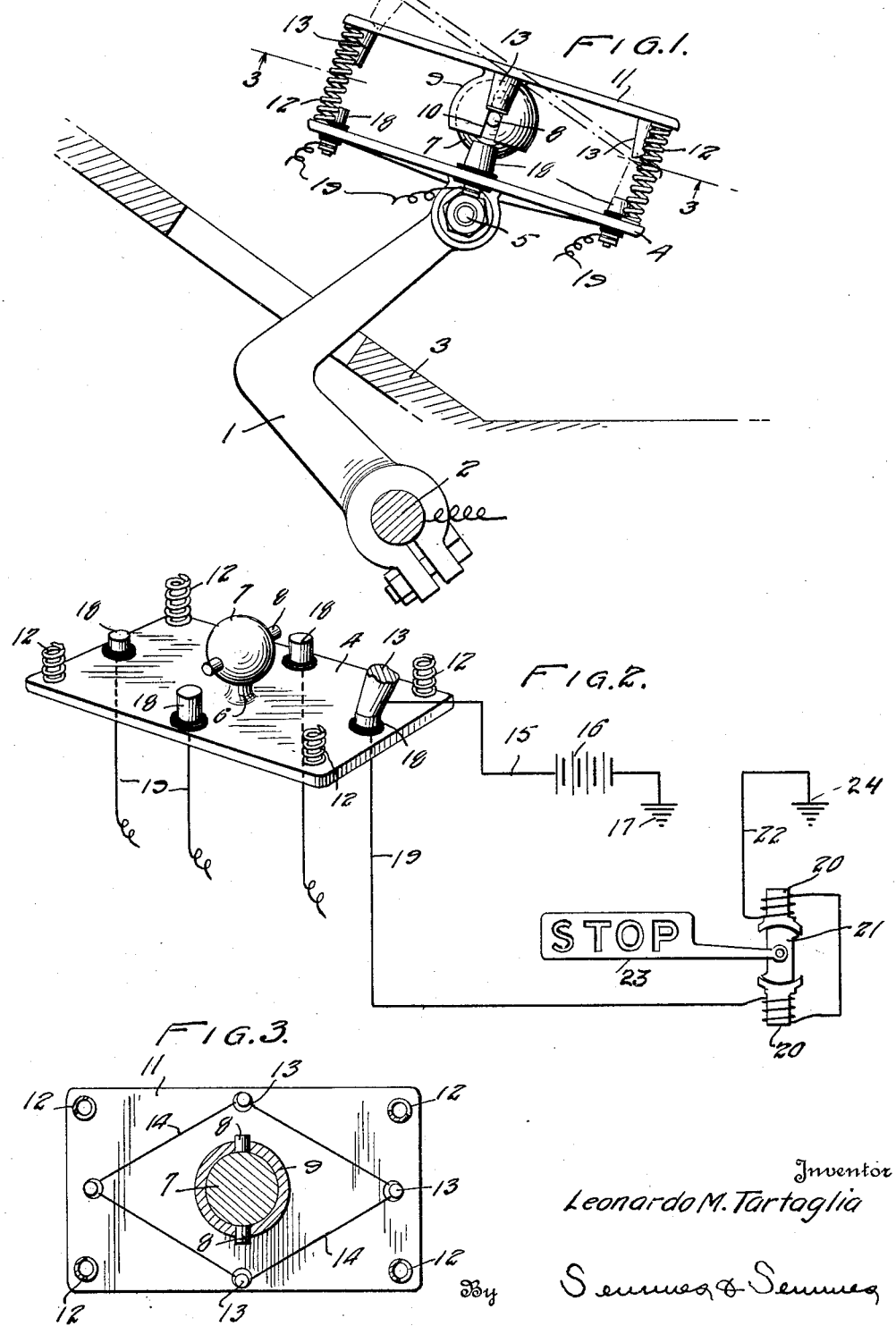
Inventor
Leonardo M. Tartaglia
By Semmes & Semmes
Attorneys Patented Nov. 3, 1931

1,830,298

UNITED STATES PATENT OFFICE

LEONARDO M. TARTAGLIA, OF ALBUQUERQUE, NEW MEXICO

CIRCUIT CLOSING DEVICE

Application filed April 24, 1926. Serial No. 104,408.

This invention relates to circuit closing devices and particularly to such a device adapted to be operated simultaneously with the actuation of a clutch pedal of a motor vehicle.

An object of the invention is to provide a make and break device mounted upon a clutch pedal to be actuated simultaneously with the operation of the pedal. The operation of the device will, therefore, be under the immediate control of a driver at all times without necessitating the removal of his hands from the steering wheel of the vehicle.

Another object of the invention is to provide a device of the character described and to construct the same in such a manner that it may be easily and quickly attached or removed without necessitating any particular skill.

Another object of the invention is to provide an actuating pedal mounted upon the clutch lever of a motor vehicle so that upon the operation of the motor clutch pedal by the driver a circuit will be closed to actuate a semaphore, and indicate positively the driver's intention as to his direction of travel, his speed, or his stopping.

A further object of the invention is to provide an actuating pedal mounted upon a clutch lever and operated therewith to indicate the driver's intention as to his operation of the vehicle and to construct such a device which is highly efficient in operation, yet of marked simplicity as a whole and in respect to each of its component parts, that its manufacture may be economically facilated both as to parts and their assembly.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claim.

In order to make my invention more clearly understood, I have shown in the accompanying drawings means for carrying the same into practical effect, without limiting the improvements in their useful applications to the particular construction, which for the purpose of explanation, have been made the subject of illustration.

In the drawings forming a part of this specification:

Figure 1 is a view in side elevation of a clutch lever with my improved actuating pedal mounted thereupon, Fig. 2 is a perspective view of the lower portion of the pedal with a diagrammatic illustration of its electrical connections for operating a semaphore, and Fig. 3 is a sectional view taken on lines 3—3 of Figure 1.

Referring by numerals to the drawings, 1 represents a clutch lever mounted upon a shaft 2, which lever projects through the floor boards 3 of a motor vehicle in the usual and well known manner. The usual form of pedal is removed and in lieu thereof a plate 4 is provided. The plate 4 is pivotally mounted by a bolt 5. In the center of the plate 4 is an upstanding short arm 6 supporting a ball 7 through the center of which, in a parallel position to the plate 4, is a pin or shaft 8. The ball 7 receives and supports a socket 9 provided with slots 10 adapted to straddle the shaft or pin 8. In this connection it is to be noted that the slots 10 are of such formation as to allow rocking of the socket forward and backward and from side to side, such rocking movement, however, is more or less restricted, the object of which will hereinafter appear.

Mounted upon the socket 9, or formed integral therewith, is an actuating pedal 11. The actuating pedal 11 is normally supported in a parallel position with respect to the pedal or plate 4 by coiled springs 12 mounted at each corner between the actuating pedal 11 and the clutch pedal or plate 4. The actuating pedal 11 is provided with four contacts 13 one on each side and one on each of the ends.

The contacts 13 may be connected in series as shown at 14, and connected by a suitable conductor 15 to one terminal of a battery 16, the other terminal of which is grounded as shown at 17, or the conductor may be connected to the pedal. The contactors 13 are adapted to contact with insulated contactors 18 mounted upon the plate or pedal 4 in the same relative position as the contactors 13 on the actuating pedal 11.

It will be seen that any one set of the contactors 13 and 18 may be brought in contact upon operating the actuating pedal with the foot by applying the pressure either to the right, left, forward or back, according to the set of contacts it is desired to connect, such manipulation being effected simultaneously with the operation of the clutch pedal. It will be observed that by exerting pressure in either direction and downwardly the contactors are brought together to effectually close a circuit to actuate any one of a series of semaphores.

Contact between the contactors is made with precision due to the restricted movement of the actuating pedal by virtue of its particular mounting. The mounting of the actuating pedal is so designed that it will be impossible for any given pair of contactors to be out of alignment when the pedal is operated to close a circuit to actuate a semaphore, the semaphore being controlled through a circuit connected to one of the pedal contactors.

For example if contactors 13 and 18 upon the back of the pedal are brought in contact, a circuit will be closed and current will flow through a suitable conductor 19 connected to one of the magnetic field windings 20 of an armature 21, the corresponding magnetic winding being connected by a suitable line 22 and grounded as indicated at 24. Thus a magnetic flux will be set up and the armature 21 actuated to raise a semaphore 23 as clearly shown in Figure 2. Figure 2 is a diagrammatic illustration showing the operation of one of a series of semaphores. It is of course to be understood that each of the semaphores is operated in a like manner. Thus the signal device may be constructed to display any number of semaphores according to the fancy of the producer.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claim.

Having thus described the various features of my invention, what I claim as new and desire to secure by Letters Patent is:

An automobile signalling device comprising a clutch pedal, an actuating pedal superimposed on the clutch pedal, and centrally pivoted thereon for longitudinal rocking movement in one direction through a ball and socket joint, the ball being provided with aligned pins radially extending with respect to the clutch pedal, adapted to engage registering slots in the wall of the socket to prevent rocking movement of the actuating pedal except in one direction, and a plurality of contacts arranged in pairs, one on the clutch pedal and one on the actuating pedal, for selectively closing a plurality of circuits.

In testimony whereof I affix my signature.

LEONARDO M. TARTAGLIA.